United States Patent [19]

Lenert

[11] Patent Number: 4,583,307

[45] Date of Patent: Apr. 22, 1986

[54] CLEARING APPLIANCE, ESPECIALLY FOR SNOW CLEARANCE

[76] Inventor: Eugène Lenert, Biwer, Luxembourg

[21] Appl. No.: 593,122

[22] Filed: Mar. 26, 1984

[30] Foreign Application Priority Data

Apr. 5, 1983 [LU] Luxembourg .......................... 84731

[51] Int. Cl.⁴ ........................ E01H 5/06; E01H 5/09
[52] U.S. Cl. ....................................... 37/233; 172/519
[58] Field of Search ................. 37/233, 242, 244, 247, 37/219; 172/519, 522, 574

[56] References Cited

U.S. PATENT DOCUMENTS

| Re. 23,411 | 9/1951 | Stenzel | 56/372 |
|---|---|---|---|
| 824,183 | 6/1906 | Knowlton | 37/244 X |
| 1,430,608 | 10/1922 | White | 172/522 |
| 2,400,906 | 5/1946 | Beck | 37/244 X |
| 2,532,652 | 12/1950 | Wray, Sr. | 56/377 |
| 2,549,043 | 4/1951 | Arthur | 37/233 X |
| 2,670,588 | 3/1954 | Plant | 56/377 |
| 2,889,640 | 6/1959 | Endres | 37/263 |
| 2,976,939 | 3/1961 | van der Lely | 172/522 |
| 3,021,661 | 2/1962 | Couberly | 37/233 X |
| 3,103,678 | 9/1963 | Smith | 15/79 R |
| 3,297,096 | 1/1967 | Woolridge | 37/244 X |
| 3,315,381 | 4/1967 | Fisher | 37/233 X |
| 3,545,109 | 12/1970 | Boschung | 37/233 |
| 3,548,522 | 12/1970 | Roper | 37/233 |
| 3,666,020 | 5/1972 | Hess | 37/219 X |
| 3,775,878 | 12/1973 | Beckner | 37/233 |

FOREIGN PATENT DOCUMENTS

| 976328 | 6/1963 | Fed. Rep. of Germany . |
| 2140482 | 2/1973 | Fed. Rep. of Germany ........ 37/233 |
| 1409579 | 7/1965 | France . |
| 753478 | 7/1956 | United Kingdom . |

OTHER PUBLICATIONS

"Der Traktor" (The Tractor), vol. 15, No. 3, Mar. 1953, (published by the Swiss Tractor Association).

Primary Examiner—Edgar S. Burr
Assistant Examiner—Moshe I. Cohen
Attorney, Agent, or Firm—Schwartz, Jeffery, Schwaab, Mack, Blumenthal & Evans

[57] ABSTRACT

The clearing appliance has a number of clearing elements (4) mounted so that they can rotate on a support beam (3). The clearing elements are arranged one after the other in a line and are offset transversely with respect to one another. The axes of rotation of the clearing elements (4) are angled in relation to the appliance longitudinal axis and the clearing elements (4) are tilted relative to the horizontal plane. Each clearing element (4) is concave in shape, and the concave side points downwards and forwards and comprises an outer ring (17) made of elastic material in the form of a truck tire cut in half perpendicular to its axis of rotation.

12 Claims, 3 Drawing Figures

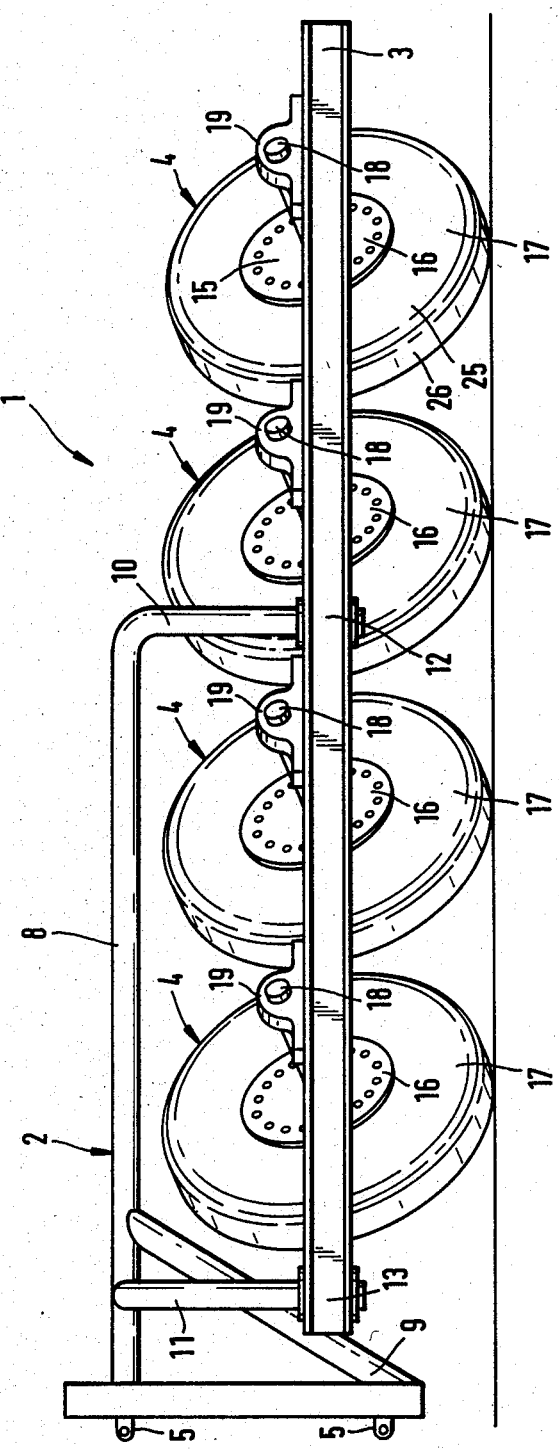

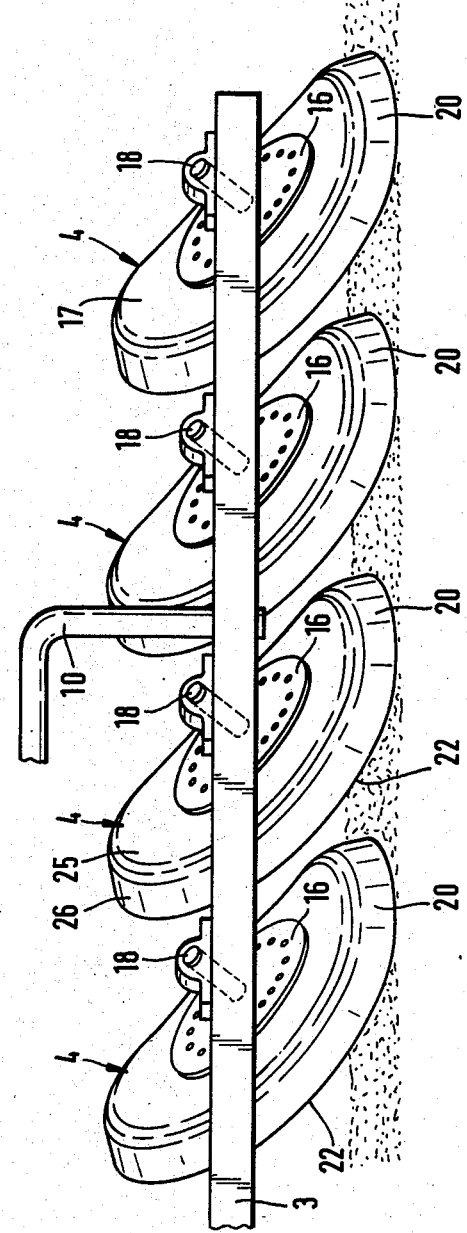

CLEARING APPLIANCE, ESPECIALLY FOR SNOW CLEARANCE

The invention concerns a clearing appliance, especially an appliance for clearing snow, having at least one rotatable concave clearing element mounted at an inclination on a support frame, the axis of which element is angled diagonally across the longitudinal axis of the appliance, the concave side of the cleaning element facing downwards and diagonally forwards with respect to the longitudinal axis of the appliance.

A clearing appliance having rotatable clearing elements is shown in DE-PS No. 976 328. In this case the clearing elements are arranged vertically with respect to the surface to be cleaned in the snow clearing position. The clearing elements only have point contact with the ground, however, for cleaning a wider surface a large number of cleaning elements must be arranged very close to one another. Even then the cleaning performance is still very imperfect. In addition, the envisaged sheet steel or brush rims of the clearing elements have to roll along over the ground, and tend to wear quickly and require frequent replacement. Indeed, steel rims cannot come into consideration for cleansing streets, public ways and the like due to the noise to be expected during operation. On the other hand, brushes have the disadvantage that even after a relatively short period of service they lose a considerable proportion of their effectiveness due to the accumulation of dirt or snow which becomes caught in between the individual bristles. Brushes are therefore only suitable for removing dust, dry debris and the like. The presently-known appliance is used primarily as a ground dressing appliance and is less suitable for use as a clearing appliance. For use as a clearing appliance, in fact, only clearing elements fitted with brushes can be considered, and these suffer from the disadvantages described above.

The Dutch patent specification No. 113 757 describes a similar clearing appliance. In this instance, the clearing elements, which are also fitted with brushes around the rims, stand vertically on the surface to be cleaned. This known appliance also has a highly unsatisfactory cleansing performance.

Other known snow clearers or snowploughs have a single, essentially static, blade arranged diagonally across the direction of forward travel of the snowplough. This clearing blade, which is moved over the road surface as close to it as possible, is not only exposed to a considerable risk of suffering damage but also itself damages the carriageway where there are uneven parts of the road surface, manhole covers, pavement edges and the like. This danger is all the greater, the closer the static clearing blade is brought to the road surface in order to clear away the snow as completely as possible. However, with existing snowploughs complete clearance of the snow is impossible, for in order to achieve this the bottom edge of the clearing blade would have to continually slide along the road surface, and even then snow would remain in any hollows or the like. Moreover, the present known snowplough is very noisy in operation, since it continually comes into contact with the road surface if this is uneven, particularly with elevations for service installations, and this produces loud, hard blows. In addition, the vehicle on which the snowplough is mounted oscillates strongly up and down, especially where the road surface is uneven, which causes the static clearing blade to strike the carriageway still more.

The purpose of the invention is to provide a simple, low-wear clearing appliance which is able to almost completely remove a covering of snow or the like with little operating noise, without there being any damage to the road or the appliance to fear.

The invention is designed to fulfill this purpose by having the clearing element equipped with an elastic or flexible ring, part of which is configured roughly radially to the axis of rotation of the clearing element, and of which at least the part which protrudes beyond the plane of rotation of the clearing element and which forms the radial, outer region of the flexible ring is made of a rubber-like material. Rubber-like material can be natural or synthetic rubber, or elastomer.

To clean a surface, for example to remove mud, slush, snow or the like, the clearing appliance is swung down from its raised transport position and placed under the surface to be cleaned. Under the influence of the weight of the clearing appliance, the flexible rubber rings on the outside of the clearing elements lie with their undersides substantially flat against the surface to be cleaned. While the clearing appliance is moved forwards, the clearing elements are set into rotation about their axes of rotation. The clearing elements do not simply roll along the surface to be cleaned, but are pressed against it by the weight of the clearing appliance and also pushed or pulled at an angle to their axes of rotation, so that to a certain extent they mould themselves to the surface to be cleaned. It has been found that in this way the free edge of each and very ring lies against the ground over a length which corresponds to approximately half the external diameter of the clearing element. The flexible rings of the clearing elements deform in the course of this and perform a flexing motion, similar to that of a motor vehicle tire running along a road, although the deformation due to the flexing is considerably greater than that of a motor vehicle tire since the clearing elements are pulled or pushed across the ground while in an inclined position. In this way, each clearing element works over a strip of substantial width of the surface to be cleaned. The clearing elements are pressed against the ground by elastic deformation and clear it virtually totally of dirt, debris, snow and the like with a scrubbing or rubbing action. However, this flexible pressure is exercised so gently that soft ground surfaces, such as meadows, fields, parks, wood, etc., can be cleaned without damage to the turf or forest soil, etc. The appliance as featured in the invention is therefore of wide application in agriculture as well. In functions silently, is subject to minimal wear and clears away mud or other dirt and snow coverings virtually totally, even on uneven roads or in corners between road surfaces and pavements at a higher level, something which up till now could not be done with any clearing appliance.

This working action of the appliance as featured in the invention and the advantages it brings are surprising to experts. The present state of technology was unable to suggest how and by what methods the purpose of the invention could be fulfilled.

A clearing appliance with one single clearing element is particularly suitable for cleaning depressions such as roadway gutters or drainage channels. For cleaning a wider surface, however, the clearing appliance has two or more clearing elements spaced out along the direction of the longitudinal axis of the appliance, and staggered transversely across the appliance The clearing elements are preferably mounted on a beam located obliquely to the appliance longitudinal axis or to the direction of travel, the oblique location of the beam being adjustable with respect to the longitudinal axis. The clearing elements can be fastened to the beam by means of quick-release fasteners. This enables the appliance to be quickly changed over from cleaning depressions with a single clearing element or to cleaning broad road surfaces with a number of clearing elements.

Specially manufactured rubber-like or rubber-elastic rings with particularly high resistance to wear, which have to be fastened to a central, rigid hub part, can be used as clearing elements. It is particularly advantageous to use for these rings motor vehicle tires, especially used truck tires, cut in half through the tread vertically to the axis of rotation. It was established on a clearing appliance built for test purposes that such used truck tire halves have a long service life as rubber-elastic elements and clear away a snow covering completely, without any annoyance due to noise. Used motor vehicle tires are available in virtually unlimited numbers and can thus be unexpectedly re-used. This also has a favourable influence on the appliance manufacturing costs.

The clearing appliance as featured in the invention is not merely suitable for clearing away snow but can also be employed for all cleansing work, for example removing mud, gravel, coarse gravel, sand or other dirt from carriageways, paths, road drains, etc.

Further characteristics of the clearing appliance are shown in the subclaims. Design examples of the clearing appliance are shown in the Figures, and will be described more fully now. The figures show:

FIG. 2 is a side elevation of the clearing appliance in the direction of the arrow P in FIG. 1.

FIG. 3 is a similar view to FIG. 2, showing a clearing appliance in operation.

Figure 1:
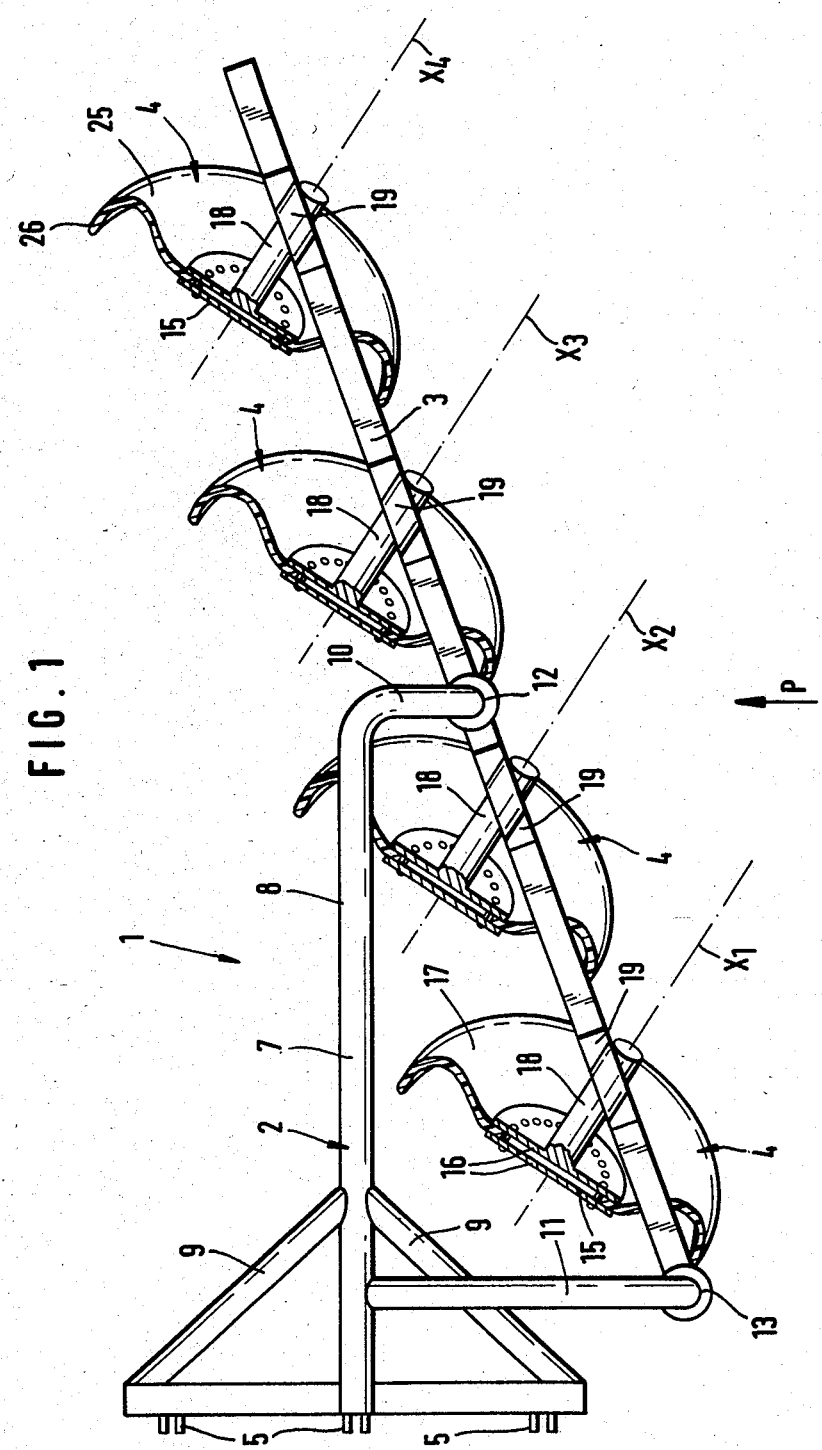
FIG. 1 is a plan view of the clearing appliance.

The clearing appliance consists of a support frame 2, a beam 3 attached to the support frame, and a number of basket-, plate- or bowl-shaped concave, circular, rotatable clearing elements mounted at a downwards inclination 4. The support frame 2 is provided with a mounting 5 at one end for attachment to the three-point hydraulic linkage of a motor vehicle. The support frame 2 has a bracing tube 8 which extends rearwardly in the direction of the appliance longitudinal axis 7 above the clearing elements 4. The bracing tube 8 is stayed by steadying struts 9. At the rear end of the bracing tube 8 there is an arm 10 running down and sideways, which is attached to the beam 3. Towards the front end of the bracing tube 8 there is a further, longer arm 11, which also runs down and sideways. The beam 3 is attached at points 12 and 13 with the short supporting arm 10 and the long supporting arm 11 respectively, and is thereby held at an oblique angle to the longitudinal axis 7 of the appliance or to the direction of travel of the tractor vehicle.

The clearing elements 4 are angled across the longitudinal axis 7 of the appliance, and their concave sides point forwards and downwards. The clearing elements are spaced out along the longitudinal axis 7 of the appliance and staggered transversely across the appliance. The axes of rotation X1 to X4 of the clearing elements 4 are located in vertical planes which are angled with respect to the longitudinal axis 7 of the appliance. Furthermore, the axes of rotation X1 to X4 of the clearing elements are inclined within these planes so that they run downwards from the back to the front, as can best be seen in FIG. 2.

Every clearing element 4 has a central, rigid hub 15 consisting of two discs 16 bolted or screwed together, between which an elastic or flexible ring 17 made of rubber-like or rubber-elastic material is sandwiched, part of which at least is radial to the axis of rotation of the clearing element 4 and constitutes the concave-shaped radial outer region of the clearing element. The ring 17 has a circular, radial side flank 25, which lies approximately in the same plane as the hub 15 and the disc 16 and the inner circumference of which is firmly screwed or bolted in between these discs 16, the outer diameter of the side flank 25 being shaped as a circumferential rim or collar 26 which is predominantly vertical with respect to the side flank 25. The elastic ring 17 can have a semi-toroidal, L-shaped or hook-shaped cross section. The flexible rubber ring 17 may be reinforced by steel or cord plies, and should preferably have the cross section shape of a motor vehicle tire cut in half along the tread perpendicular to its axis of rotation. It may be manufactured from worn truck tires. It is also possible to produce the radial side flank 25 of the ring 17 from a thin metal ring to which the rubber-like circumferential rim or collar 26 is attached.

Each hub 15 is mounted on a shaft 18 which is able to rotate in a bearing 19 provided on the beam 3. The shaft 18 is retained axially in the bearing 19 by a quick-release fastening which can be re-fastened (not shown here).

The beam 3 is preferably held at an angle of between 15° and 45° to the longitudinal axis of the appliance 7. This angle can be adjustable, in which case the attachment point 12 of the beam 3 to the short supporting arm 10 can be designed as a pivot bearing. An adjustable mounting capable of being locked in position (not shown here) is the required between the front end of the beam 3 and the long supporting arm 11.

The angle between the vertical planes of the axes of rotation X1–X4 of the clearing elements 4 and the longitudinal axis 7 of the appliance should preferably be 15° to 45°.

In FIGS. 1 and 2, the appliance is shown raised up in the transport position. FIG. 3 shows an appliance as featured by the invention in the working position. The appliance shown in FIG. 3 has the same design as the appliance in FIGS. 1 and 2, with the exception that in FIG. 3 the clearing elements are tilted more acutely.

The clearing elements form an angle of about 35° to 55° with the horizontal, or with the surface to be treated. It can be seen clearly in FIG. 3 that the lower region 20 of the rubber-elastic ring 17 lies against the surface to be treated with a considerable length of its free edge 22. This means that the clearing elements pick up the material to be cleared away over a substantial width of their concave inner sides, and scoop it away to the side of the surface to be cleaned with a scrubbing or rubbing action.

I claim:

1. Clearing appliance, especially an appliance for clearing snow, comprising: a support frame, at least one clearing element rotatably mounted on said frame and having a concave forward side, said clearing element being driven by ground contact about an axis of rotation when the clearing appliance is advanced in a forward direction of operation, said clearing element being rotatable in a plane inclined forwardly with respect to the ground and oriented obliquely with respect to the forward direction of operation, and said clearing element being fitted with an outer flexible annular ring of rubber-like material comprising a first portion approximately radial to the axis of rotation and a second substantially cylindrical portion having a free edge for ground engagement, said rubber-like material being temporarily deformed in response to engagement with the ground as said clearing element rotates about said axis of rotation such that a significant portion of said free edge always contacts the ground, the axis of rotation of said clearing element forming a selected acute angle both with the ground and the forward direction of operation such that rotational movement is caused by said ground engagement.

2. Clearing appliance as in claim 1, characterised by the fact that each clearing element has a rigid hub which carries the elastic or flexible ring, this ring having a circular side flank made of rubber-like material, connected to the hub at its internal circumference and exhibiting a peripheral rim which is predominantly perpendicular to the side flank around its outer circumference.

3. Clearing appliance as in one of the claim 1, characterised by the fact that the axis of rotation of the clearing element forms an angle of 15° to 45° with the longitudinal axis of the appliance.

4. Clearing appliance as in claim 1, characterised by the fact that the clearing elements are at angle of approximately 35° to 55° to the horizontal plane.

5. Clearing appliance as in claim 1, characterized in that the free edge of the annular ring portion engages the ground along a portion of at least about one sixth (1/6) of its circumferential length.

6. Clearing appliance as in the claim 1, characterised by the fact that the ring is reinforced by steel or cord plies.

7. Clearing appliance as in claim 6, characterised by the fact that the elastic ring consists of half a motor vehicle tire, cut vertically to its axis of rotation, which is clamped between two hub plates at its internal circumference.

8. Clearing appliance as in claim 1, characterised by the fact that two or more clearing elements are arranged spaced out along the longitudinal axis of the appliance and staggered transversely across the appliance.

9. Clearing appliance as in claim 8, characterised by the fact that the clearing elements are mounted on a beam running at an oblique angle to the longitudinal axis.

10. Clearing appliance as in claim 9, characterised by the fact that the clearing elements are fastened to the beam by means of quick-release fastenings.

11. Clearing appliance as in claim 9, characterised by the fact that the angled location of the beam with respect to the longitudinal axis is capable of adjustment.

12. Clearing appliance as in one of the claim 9, characterised by the fact that the beam forms an angle of 15° to 45° with the longitudinal axis.

* * * * *